(12) United States Patent
Ikuno (10) Patent No.: US 8,976,406 B2
(45) Date of Patent: Mar. 10, 2015

(54) PRINT CONTROL APPARATUS, CONTROL METHOD, AND STORAGE MEDIUM WHERE PROGRAM IS STORED FOR PRINTING IMAGE DATA ON SHEET, CONTROLLING A BINDING PROCESS FOR BINDING A PLURALITY OF SHEETS WITHOUT STAPLE, AND ADJUSTING THE PRINTING AREA OF THE IMAGE DATA TO BE PRINTED WHEN PERFORMING OF THE BINDING PROCESS

(71) Applicant: Canon Kabushiki Kaisha, Tokyo (JP)

(72) Inventor: Takao Ikuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/771,689

(22) Filed: Feb. 20, 2013

(65) Prior Publication Data
US 2013/0215470 A1 Aug. 22, 2013

(30) Foreign Application Priority Data

Feb. 22, 2012 (JP) .................................. 2012-035976

(51) Int. Cl.
| | | |
|---|---|---|
| G06F 3/12 | (2006.01) | |
| G06K 15/00 | (2006.01) | |
| H04N 1/00 | (2006.01) | |
| B41C 1/00 | (2006.01) | |
| G06K 15/02 | (2006.01) | |

(52) U.S. Cl.
CPC .......... *G06K 15/1867* (2013.01); *G06K 15/186* (2013.01); *G06K 15/404* (2013.01); *G06K 15/1807* (2013.01)

USPC .......... 358/1.18; 358/1.1; 358/1.12; 358/1.6; 358/3.32

(58) Field of Classification Search
USPC ............. 358/1.18, 1.13, 1.14, 1.15, 448, 401, 358/403, 452, 444, 1.1, 1.6, 1.12, 453; 399/18, 1, 2, 6, 66, 45, 40, 82, 362, 399/361, 363, 365, 371, 408, 386; 412/1, 4, 412/37, 16, 23
See application file for complete search history.

(56) References Cited

U.S. PATENT DOCUMENTS

| | | | | |
|---|---|---|---|---|
| 8,038,378 | B2 * | 10/2011 | Aoki et al. | 412/36 |
| 2001/0043359 | A1 * | 11/2001 | Mori et al. | 358/1.15 |
| 2007/0008589 | A1 * | 1/2007 | Ushio et al. | 358/304 |
| 2007/0057426 | A1 * | 3/2007 | Tao et al. | 270/58.09 |
| 2008/0013973 | A1 * | 1/2008 | Kawahira | 399/45 |
| 2012/0018944 | A1 * | 1/2012 | Shiraishi | 270/58.09 |

FOREIGN PATENT DOCUMENTS

JP 8-300847 A 11/1996

* cited by examiner

*Primary Examiner* — Ngon Nguyen
(74) *Attorney, Agent, or Firm* — Canon U.S.A., Inc., I.P. Division

(57) ABSTRACT

A print control apparatus performs a print process for printing image data on a sheet, controls a binding process for binding a plurality of sheets without a staple, and adjusts the printing area of the image data to be printed when performance of the binding process is designated.

17 Claims, 13 Drawing Sheets

PRINT CONTROL APPARATUS, CONTROL METHOD, AND STORAGE MEDIUM WHERE PROGRAM IS STORED FOR PRINTING IMAGE DATA ON SHEET, CONTROLLING A BINDING PROCESS FOR BINDING A PLURALITY OF SHEETS WITHOUT STAPLE, AND ADJUSTING THE PRINTING AREA OF THE IMAGE DATA TO BE PRINTED WHEN PERFORMING OF THE BINDING PROCESS

BACKGROUND OF THE INVENTION

1. Field of the Invention

Aspects of the present invention generally relate to a print control apparatus for controlling a printing unit to print image data on a sheet, a control method for controlling the print control apparatus, and a storage medium.

2. Description of the Related Art

A sheet processing apparatus for performing post-processing on an output printed sheet is attached to some image processing apparatuses with a copy function and a printer function. Representative functions of the sheet processing apparatus include a staple binding function. The staple binding function is a function for binding sheets using a metallic staple.

Since the stapled printed product is easy to handle for each single copy, it is widely used when an output product with a plurality of pages is handled.

However, recently, binding methods without using a staple (also referred to as stapleless binding) are devised in consideration of the environment because the metallic staple is used for binding. For example, Japanese Patent Application Laid-open No. 8-300847 discusses a technique in which a part of a set of printed sheets to be bound is cut collectively in a semi-boring manner leaving a part thereof without being cut and the cut end portions of the sheets are folded back to bind the set of sheets.

In the printing apparatus that can perform binding processing described above, various methods without using the metallic staple have been put into practical use, and the methods have different characteristics from the staple binding methods using the metallic staple.

Specifically, the area of the sheets to be processed becomes wider to obtain a binding strength larger than a certain strength. In a case of staple binding using the metallic staple, if the binding is performed with the staple penetrating through the printed sheet bundle, a certain strength can be obtained.

However, when binding is performed using glue, for example, the required binding strength cannot be obtained if the glued area of the sheets does not have an enough area. Similarly, in the binding method for binding sheets by cutting sheets in a semi-boring manner, if the cut area of the sheet is not large, enough strength cannot be obtained. Alternatively, in the binding method for binding sheets by pressing thereof, as the area of the binding portion is larger, the binding strength becomes larger.

With the paper processing of a narrow area as the area which the staple portion occupies for binding in the conventional method using the metallic staple, the strength for binding sheets may not be obtained.

Therefore, when a user uses such a binding method without using staple (stapleless binding method), in order to obtain the binding strength desired by users, an area larger than that used conventionally needs to be processed for binding.

Hereinbelow, referring to FIG. 13, in a case where such a bound printed product is browsed, an issue that the visible area by a user becomes narrower than that in conventional method will be described.

Figure 13:
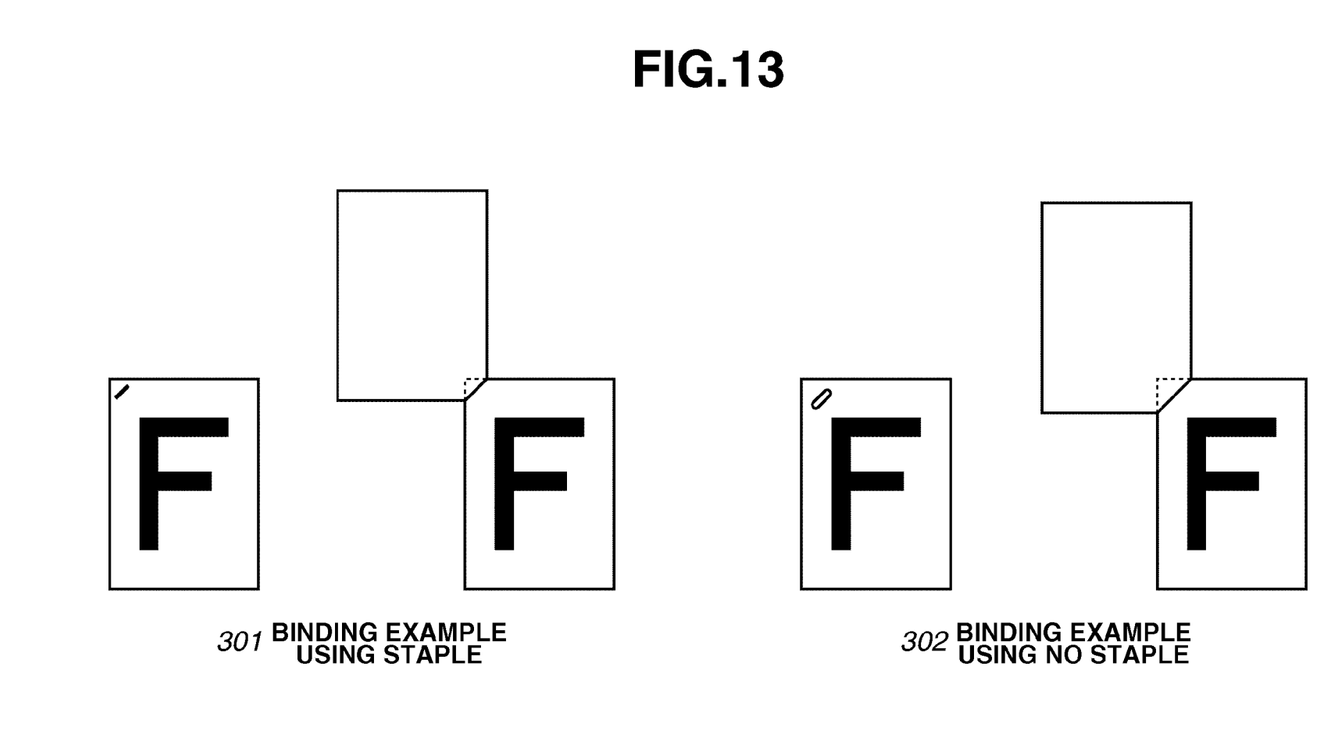
FIG. 13 is a diagram illustrating printed results of binding processing using a staple (staple binding) and without using the staple (stapleless binding).

FIG. 13 is a diagram illustrating a state where the visible area of a document becomes narrower as the binding area becomes wider. In this example, a corner of the document is bound at a point.

In FIG. 13, a staple binding example 301 which uses a metallic staple has a wider visible area of the next page portion when a page is turned over because binding strength can be obtained even if the binding is performed at an edge of the document. However, a stapleless binding example 302 which uses no metallic staple needs a wider binding portion area to obtain an enough binding strength. As a result, the binding portion is positioned inner side of the document than that when the metallic staple is used. Therefore, the visible area of the next page when a page is turned over becomes narrower. In these examples, the upper left side of the document is bound.

As described above, there is an issue that the output printed product has poorer visibility when the stapleless binding function is used than when the conventional staple binding function is used.

SUMMARY OF THE INVENTION

Aspects of the present invention relate to a print control apparatus and a print control method for printing image data on a sheet.

According to an aspect of the present invention, a print control apparatus for controlling a binding unit configured to perform a binding processing for binding a plurality of sheets without using a staple includes a printing unit configured to print image data on a sheet, and a control unit configured to adjust a printing area of the image data to be printed on the sheet when the binding processing is designated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<System Configuration>

Figure 1:
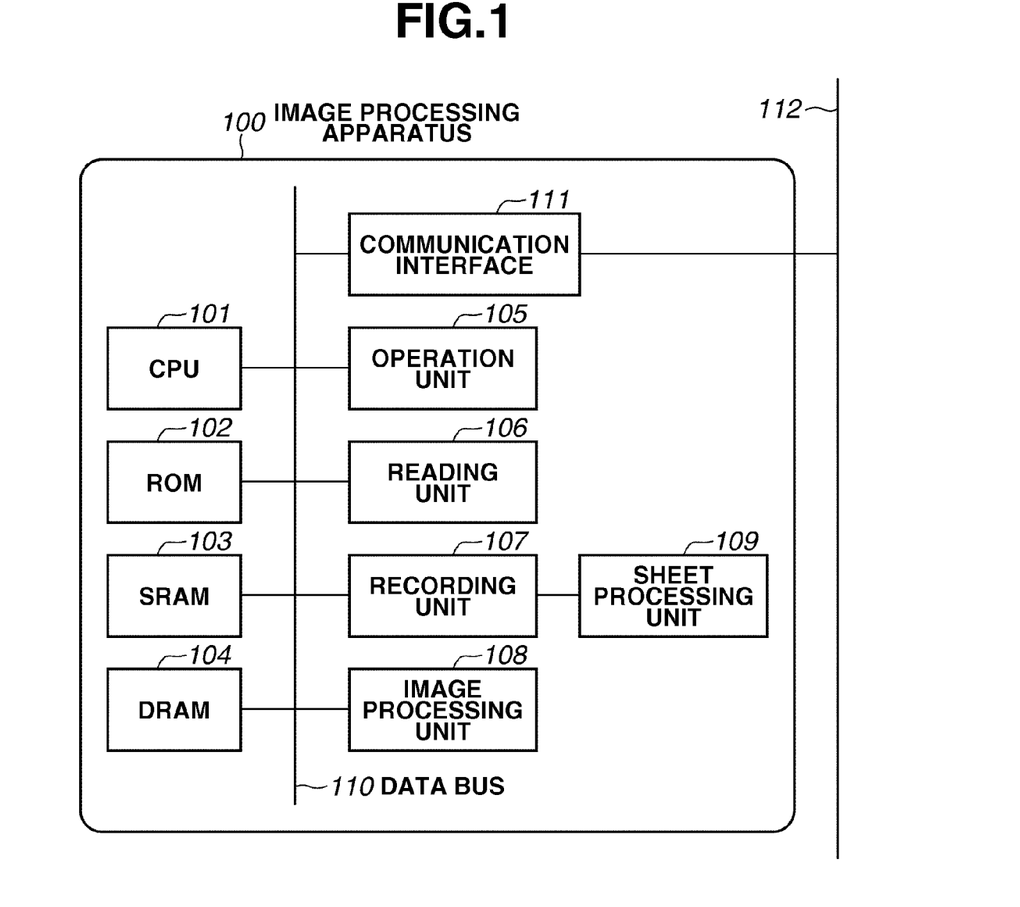
FIG. 1 is a block diagram illustrating a configuration of an image processing apparatus.

FIG. 1 is a block diagram illustrating a configuration of an image processing apparatus 100 according to an exemplary embodiment, where the image processing apparatus 100 is an example of a print control apparatus. While the following description refers to the image processing apparatus 100, any apparatus that would function as a print control apparatus would be applicable. In the present exemplary embodiment, a sheet processing apparatus for performing sheet post-processing can be connected to the image processing apparatus 100. The image processing apparatus 100 can include a reading function of reading an image and a print function for printing an image on a sheet.

In FIG. 1, a central processing unit (CPU) 101 is a control unit of a system that controls the entire image processing apparatus 100. A read only memory (ROM) 102 stores a control program for the CPU 101. A static random access memory (SRAM) 103 stores setting values registered by an operator, management data for the image processing apparatus 100, and buffers for various works. The SRAM 103 is a nonvolatile SRAM backed-up by a battery and memory contents do not disappear even if the power supply of the image processing apparatus 100 is turned off. Further, the SRAM 103 stores read image data.

A dynamic RAM (DRAM) 104 stores program control parameters and the like. An operation unit 105 is a user interface unit for displaying information of the image processing apparatus 100 to a user and can display a user interface screen described below. A reading unit 106 is a device configured to read image data to convert it into binary data. The document reading for image transmission function is performed using the reading unit 106. A recording unit 107 prints image data on a sheet. An image processing unit 108 performs encoding/decoding processing of the image data processed by the image transmission function. These units are connected to each other via a data bus 110 and the image data is transmitted via the data bus 110.

Further, the recording unit 107 is connected to a sheet processing unit 109, and the sheet printed by the recording unit 107 is conveyed to the sheet processing unit 109. The sheet processing unit 109 performs post-processing such as aligning input sheets, switching output trays, and performing binding processing for binding a plurality of sheets. In the present exemplary embodiment, the processing for binding a sheet bundle using a staple is referred to as a first binding processing, and the processing for binding a sheet bundle without using a staple is referred to as a second binding processing. They will be described distinctly below.

In the image processing apparatus 100 configured as described above, the original image is read by the reading unit 106, and the read image is converted into binary data. The read image data is stored temporarily in the SRAM 103. An operation of the image processing apparatus 100 will be described by exemplifying a print control by which the image processing unit 108 converts the stored image data, the recording unit 107 prints the converted image data on a sheet, and the sheet processing unit 109 performs post-processing on the printed sheet.

Figure 2:
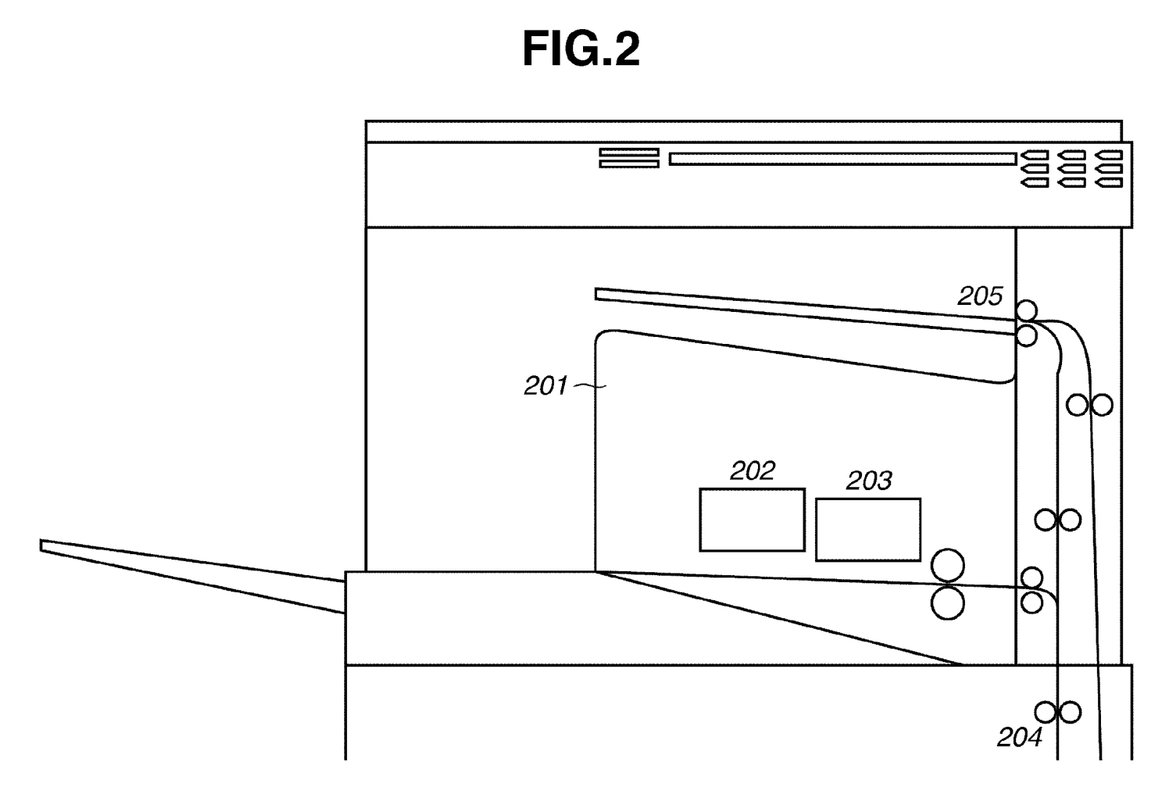
FIG. 2 is a cross-sectional view illustrating an example configuration of a sheet processing unit.

FIG. 2 is a cross-sectional view illustrating an example of a configuration of the sheet processing unit 109 illustrated in FIG. 1 in more detail. In this example, the sheet processing unit 109 is included in the chassis of the sheet processing apparatus of the image processing apparatus 100.

Though the description of the recording unit 107 including an engine unit for performing print processing is omitted, the sheet processing unit is connected to the image processing apparatus 100 main body. In addition, connection forms include an inline method and other methods, however, the application of the present embodiment is not limited thereto.

In FIG. 2, a sheet processing apparatus 201 is connected to the recording unit 107 and used in this state. A sheet is conveyed from the recording unit 107 via conveyance rollers 204. Conveyance rollers 205 are used to turn over the sheet in two-sided printing, and when the sheet is turned over, the sheet passes through the conveyance rollers 205 and enters into the recording unit 107 again to be printed on its back side. In this case also, the output sheet is conveyed through the conveyance rollers 204 to the sheet processing apparatus 201.

The sheet processing apparatus 201 includes functions for aligning and moving the output sheets. However, the present exemplary embodiment focuses on the binding function.

A first binding unit 202 is a stapler having a function for binding sheets using a metallic staple. A second binding unit 203 provides a function for binding sheets without using the metallic staple. As described above, there are a number of methods for binding sheets without using a staple. However, in the present exemplary embodiment, an example of the second binding unit 203 binds the sheets by pressure applied from the top and bottom of the sheets in the thickness direction.

Such a sheet processing apparatus is described as an example in which both the first binding unit 202 and the second binding unit 203 are mounted on the sheet processing apparatus 201. However, the configuration including only the second binding unit performing binding without using a staple is possible. The cases where both the first binding unit 202 and the second binding unit 203 are mounted and one of them is mounted, are described.

In a case where the binding function without using a staple is used, the larger area of the sheet to be subjected to the processing as described above needs to be secured compared with that in a case where staple binding using a staple is used.

Figure 3:
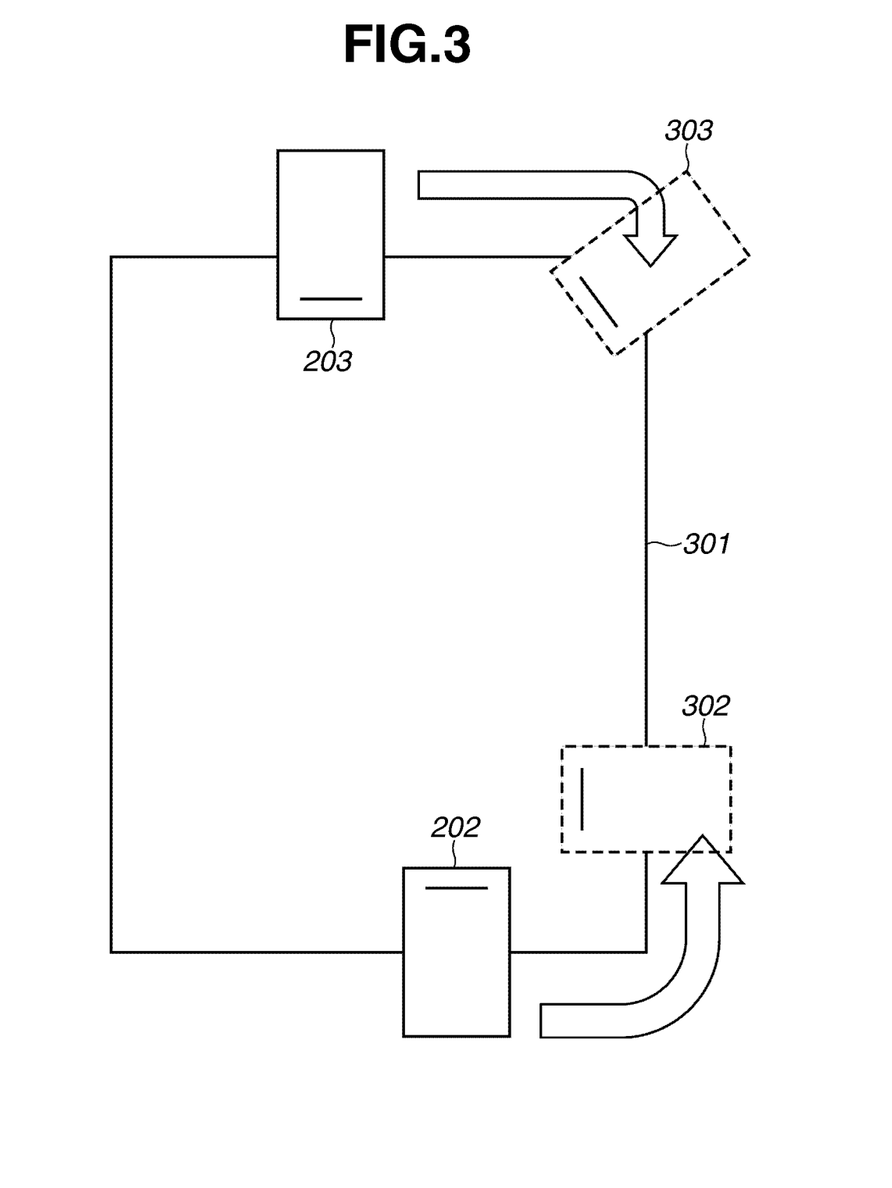
FIG. 3 is a diagram illustrating an arrangement of a first and second binding units and respective binding work areas.

FIG. 3 is a diagram illustrating an arrangement of the first and second binding units and the respective binding work areas.

FIG. 3 illustrates a state where sheets 301 are bound, and the first binding unit 202 stays at a standby position. When the sheets 301 are actually bound, the first binding unit 202 moves from its standby position to a binding position 302 indicated by an arrow to bind the sheets. Though the mechanism for moving the binding unit is not illustrated, the movement thereof is controlled by the CPU 101.

Similarly, the second binding unit 203 without using a staple normally stays at its standby position, and when sheets are actually bound, the second binding unit 203 moves from its standby position to a binding position 303 to bind the sheets 301. Thus, the first binding unit 202 and the second binding unit 203 are configured to be movable according to various binding methods by the control of the CPU 101 illustrated in FIG. 1.

Figure 4A:
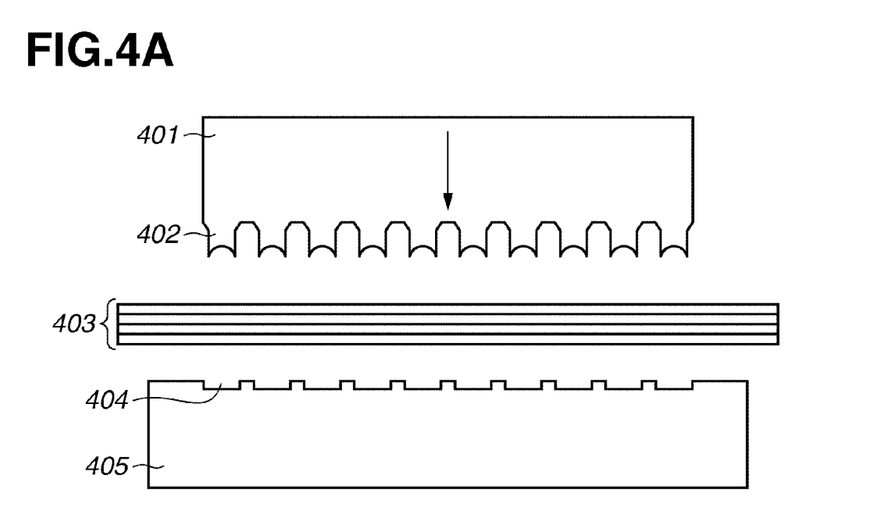
FIGS. 4A and 4B is a cross-sectional view illustrating binding processing by the second binding unit illustrated in FIG. 2.
Figure 4B:
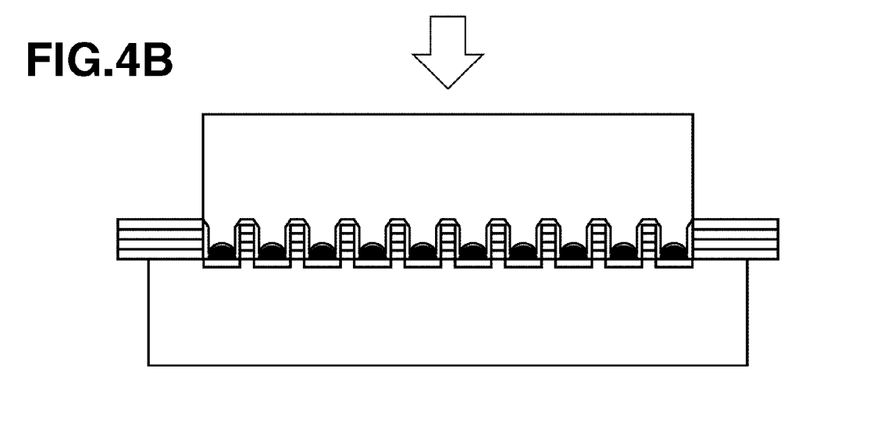

FIGS. 4A and 4B are a cross-sectional view illustrating the binding processing by the second binding unit 203 illustrated in FIG. 2. In the present exemplary embodiment, a method will be described in which sheets are bound by applying pressure from the top and bottom in the thickness direction of the sheets to contact them tightly. More specifically, the state where the sheets are set at the binding position and the second binding unit 203 has moved to the binding position 303 as illustrated in FIG. 3 corresponds to the state illustrated in FIG. 4A.

In FIG. 4A, an upper mold 401 presses the sheets by applying pressure to the sheets. The upper mold 401 has a plurality of blades with a convex shape. By applying pressure to the sheets at a plurality of positions, the sheets are made not to separate easily. A lower mold 405 presses the sheets by applying pressure to the sheets. The lower mold 405 has a plurality of concave portions 404 corresponding to convex portions 402 to receive the blades of the upper mold 401.

Figure 5:
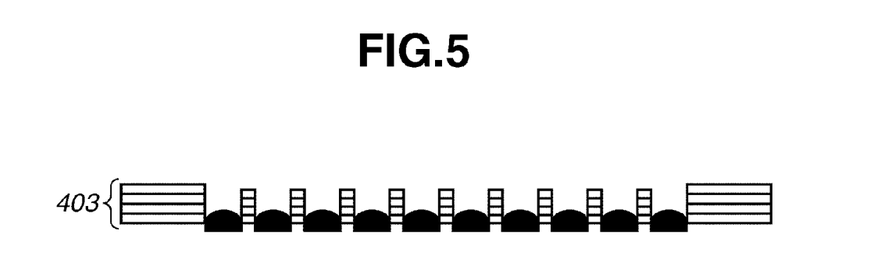
FIG. 5 is a cross-sectional view illustrating the binding processing of the second binding portion illustrated in FIG. 2.

By applying pressure to the sheets with the upper mold 401 and the lower mold 405 from the top and bottom as illustrated in FIG. 4B (by a not illustrated pressure mechanism), the sheets can be bound. The cross section of an output sheet bundle 403 after having been bound is as illustrated in FIG. 5. Viewed from the top of the sheet bundle 403, binding position 601 is as illustrated in FIG. 6.

Figure 6:
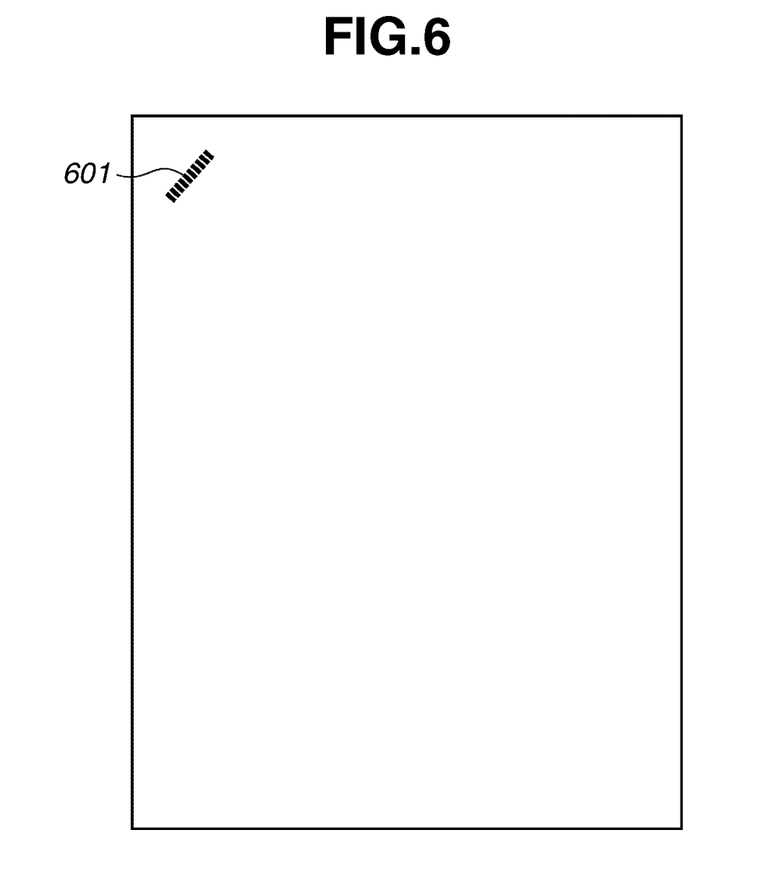
FIG. 6 is a diagram illustrating a binding position.

In the present exemplary embodiment, the black portions of the binding position 601 of the sheets in FIG. 6 are subjected to the pressure to be squashed. The sheets are bound by applying pressure to the sheets, and therefore, the number of sheets to be bound is limited to a certain number.

In addition, since the binding force is weak with one binding, the second binding can be performed.

Figure 7:
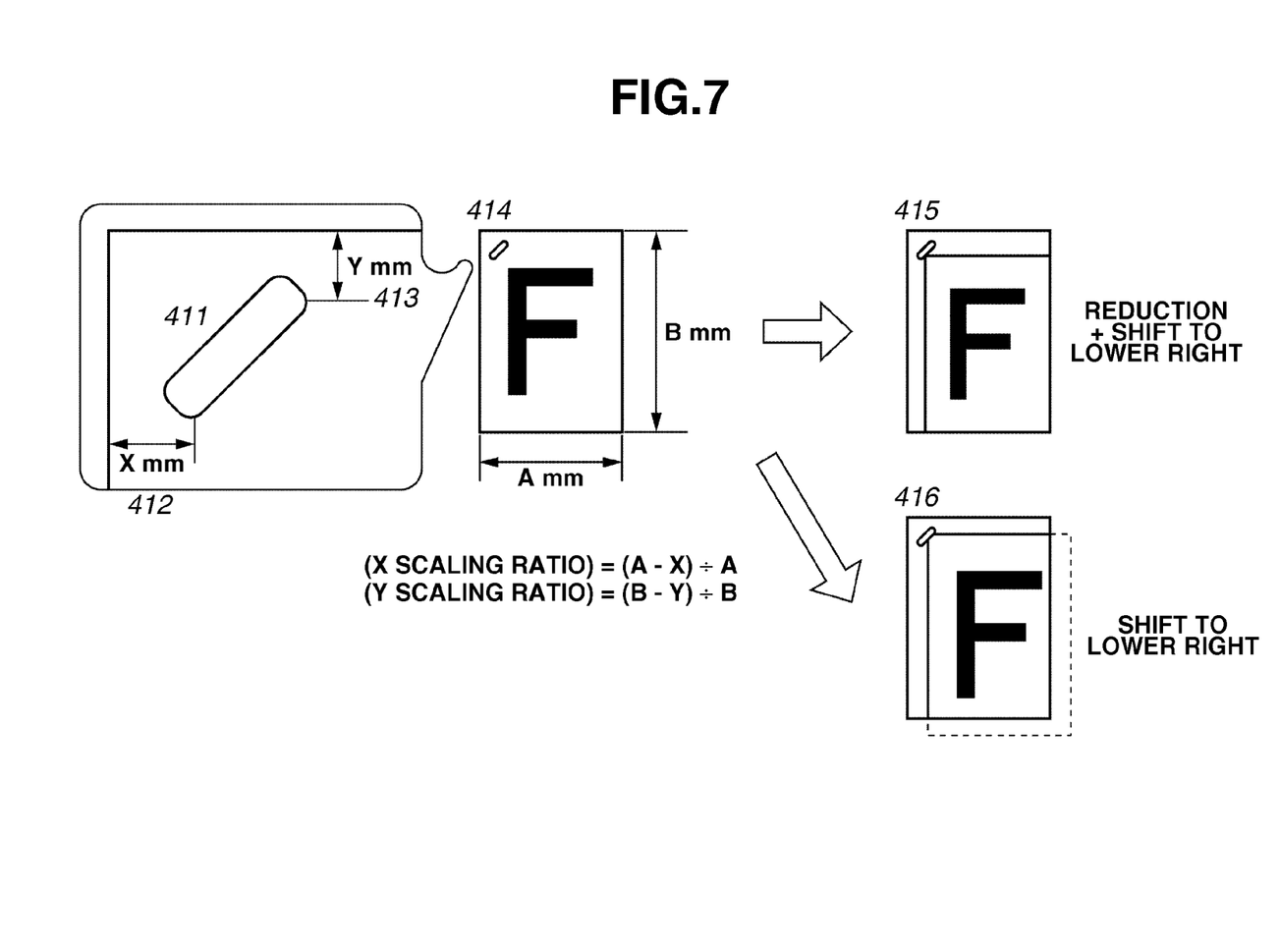
FIG. 7 is a diagram illustrating image output processing by the image processing apparatus.

FIG. 7 illustrates image output processing performed by the image processing apparatus 100 according to the present exemplary embodiment. Hereinbelow, an example of automatically adjusting the image output area when the second binding processing is selected is described.

FIG. 7 illustrates an example in which the binding function without using a staple is applied to an output product 414 at a binding position 411. In this example, one point of the top left corner of the sheets is bound. At the binding position 411, the sheets are pressed and bound for binding. It is the portion where the sheets are processed. The processed area is larger than that when a staple is used. Therefore, the image needs to be adjusted not to overlap the area.

As a specific example, a distance from the end of the output product to the binding position 411. When a distance 413 from the top end portion is Y mm and a distance 412 from the left end portion is X mm, if the image is positioned on the edge side thereof, the image is difficult to be viewed. Therefore, the image is adjusted not to overlap this area.

A first adjusted output 415 is an example adjusted by applying both reduction processing and shift displacement processing to the print data to be printed to adjust the output area.

Here, when the length in the horizontal direction of the output product is A mm, the length in the vertical direction thereof is B mm, the CPU 101 calculates scaling ratios (X scaling ratio=(A−X)/A and Y scaling ratio=(B−X)/B), to perform reduction processing on the image data. Further, by performing control to move and arrange the image to the lower right side of the output sheet, margins can be obtained at the upper end side and the left end side of the output sheet. Thus, even if the function of binding without using a staple is employed, the issue that the output product has poor visibility can be solved.

A second adjusted output 416 is an example adjusted by performing only the shift displacement processing with respect to the print data to be displaced.

In this example, the CPU 101 performs control so that the image is moved to the lower right direction by Y mm of a distance 413 from the upper end and X mm of a distance 412 from the left end and printed, and thereby margins can be provided at the upper end side and the left end side of the image. Thus, even if the function of binding without using a staple is employed, the issue that the output product has poor visibility can be solved.

Figure 8:
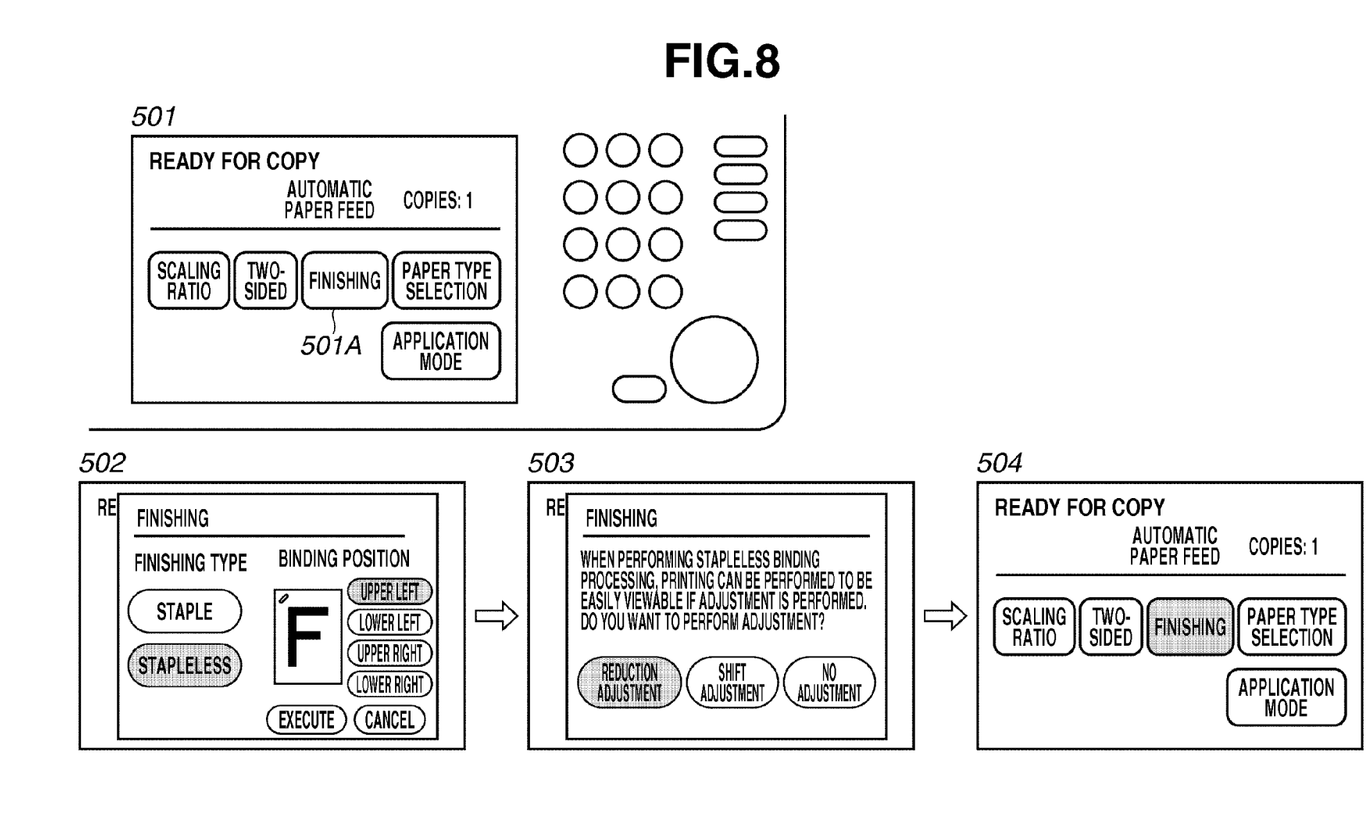
FIG. 8 is a diagram illustrating an example of a user interface (UI) screen displayed on an operation unit.

FIG. 8 is a diagram illustrating an example of a user interface (UI) screen displayed on a display unit of the operation unit 105 illustrated in FIG. 1. This example is an example of a setting screen for setting the image adjustment when a user intends to use the binding function without using a staple described above. UI screens 501 to 504 are displayed on the above described display unit displayed by the control of the CPU 101.

In FIG. 8, the UI screen 501 displays a copy standby screen. When a user intends to use the copy function using the stapleless binding function, the user presses a finishing button. The UI screen 502 illustrates an example screen for finishing setting, and the UI screen 503 illustrates a confirmation screen for the finishing setting set by the user on the finishing setting screen. The UI screen 504 illustrates a copy standby screen for returning to the finishing screen by an instruction of the user on the confirmation screen.

Figure 9:
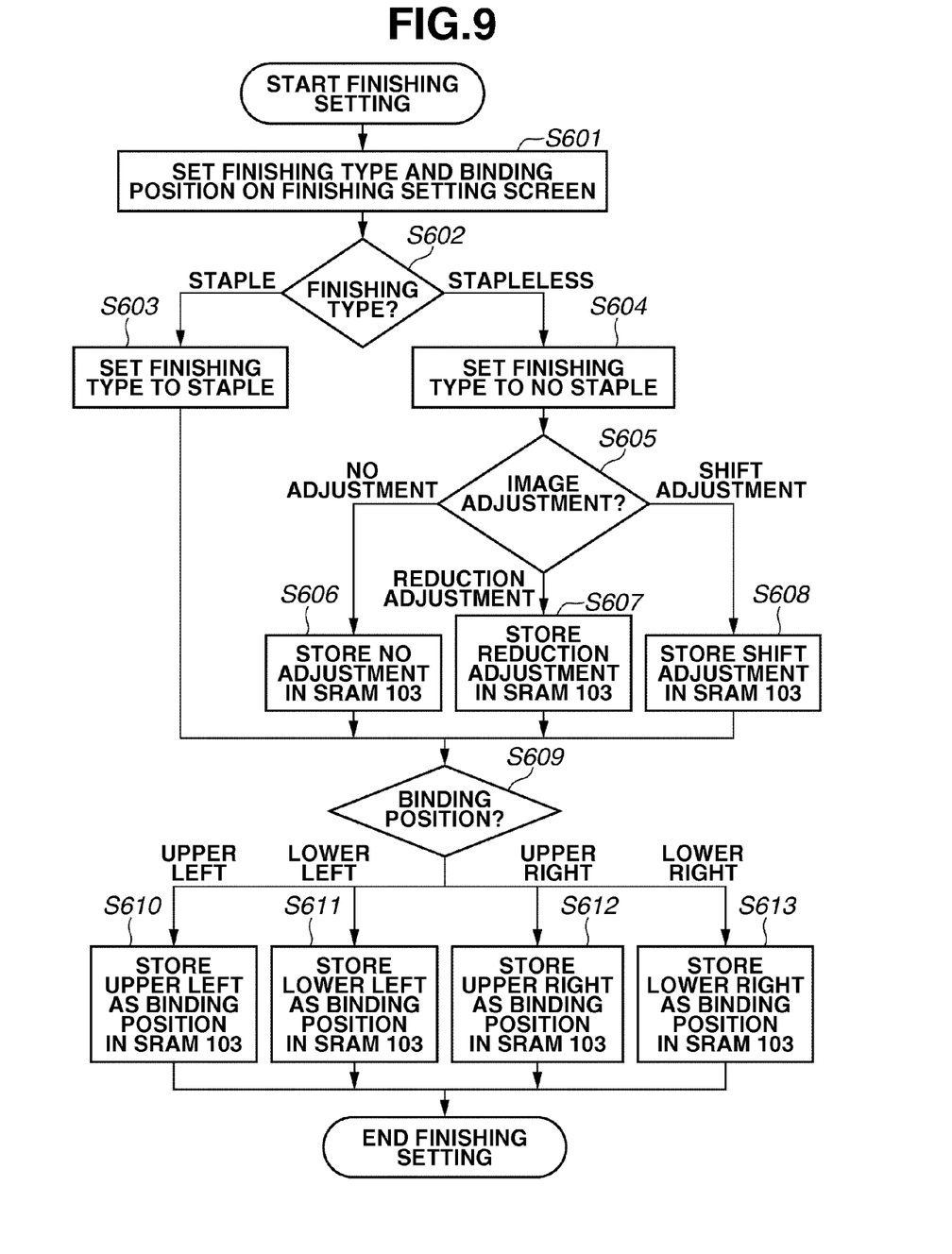
FIG. 9 is a flowchart illustrating a control method of the image processing apparatus.

FIG. 9 is a flowchart illustrating a control method of the image processing apparatus 100 according to the present exemplary embodiment. This example illustrates an example of finishing setting processing. Each step is realized by the CPU 101 illustrated in FIG. 1 executing a program for performing the flowchart of FIG. 9 stored in the ROM 102.

First, when a user presses a finishing button 501A on the UI screen 501, the CPU 101 switches the UI screen 501 to the UI screen 502. In step S601, the CPU 101 receives a finishing type and a binding position set by the user using the UI screen 502. In the example of the UI screen 502, the finishing type and the binding position (upper left, lower left, upper right, lower right) are selectable, and the setting can be cancelled and determined by using a cancel button and an execute button.

Further, the setting values relating to the finishing set by the user are stored in the SRAM 103, and the CPU 101 can confirm the setting values stored in the SRAM 103.

In step S602, the CPU 101 determines whether the set finishing type is the binding processing using a staple or without using the staple. If the CPU 101 determines that the finishing type set by the user using the UI screen 502 is the binding processing using a staple ("staple" in step S602), the processing proceeds to step S603. In step S603, the CPU 101 stores "the binding using a staple" as a registration value in the SRAM 103.

On the other hand, if the CPU 101 determines that the finishing type set by the user using the UI screen 502 is the binding processing without using a staple (stapleless in step S602), the processing proceeds to step S604. In step S604, the CPU 101 stores "the binding without using a staple" as a registration value in the SRAM 103. Then, the CPU 101 displays the UI screen 503 showing a confirmation screen for confirming whether to perform the image adjustment on the display unit to prompt the user to perform setting.

When the image adjustment method is set by the user, in step S605, the CPU 101 determines whether the setting result is "no adjustment", "shift adjustment", or "reduction adjustment". Then, the CPU 101 stores one of the settings of "no adjustment", "reduction adjustment", or "shift adjustment" as the registration value in the SRAM 103 based on the result of the setting, respectively in steps S606, S607, or S608.

In step S609, regardless of binding using a staple or without using the staple, the CPU 101 determines whether the setting of the binding position is "upper left", "lower left", "upper right", or "lower right".

At that time, the setting of any one of the "upper left", "lower left", "upper right", and "lower right" selected as a binding position as a result of the setting, is stored in the SRAM 103 as a registration value in steps S610, S611, S612, or S613. In this way, since the finishing setting has been completed, the CPU 101 once returns the UI screen of the display unit of the operation unit 105 to the UI screen 504 illustrating the standby screen.

In this state, the user performs other copy settings. Thereafter, the user presses the copy start key to start copying.

When the stapleless binding function is used in this way, the user can perform an operation of the simplified adjustment method.

Figure 10:
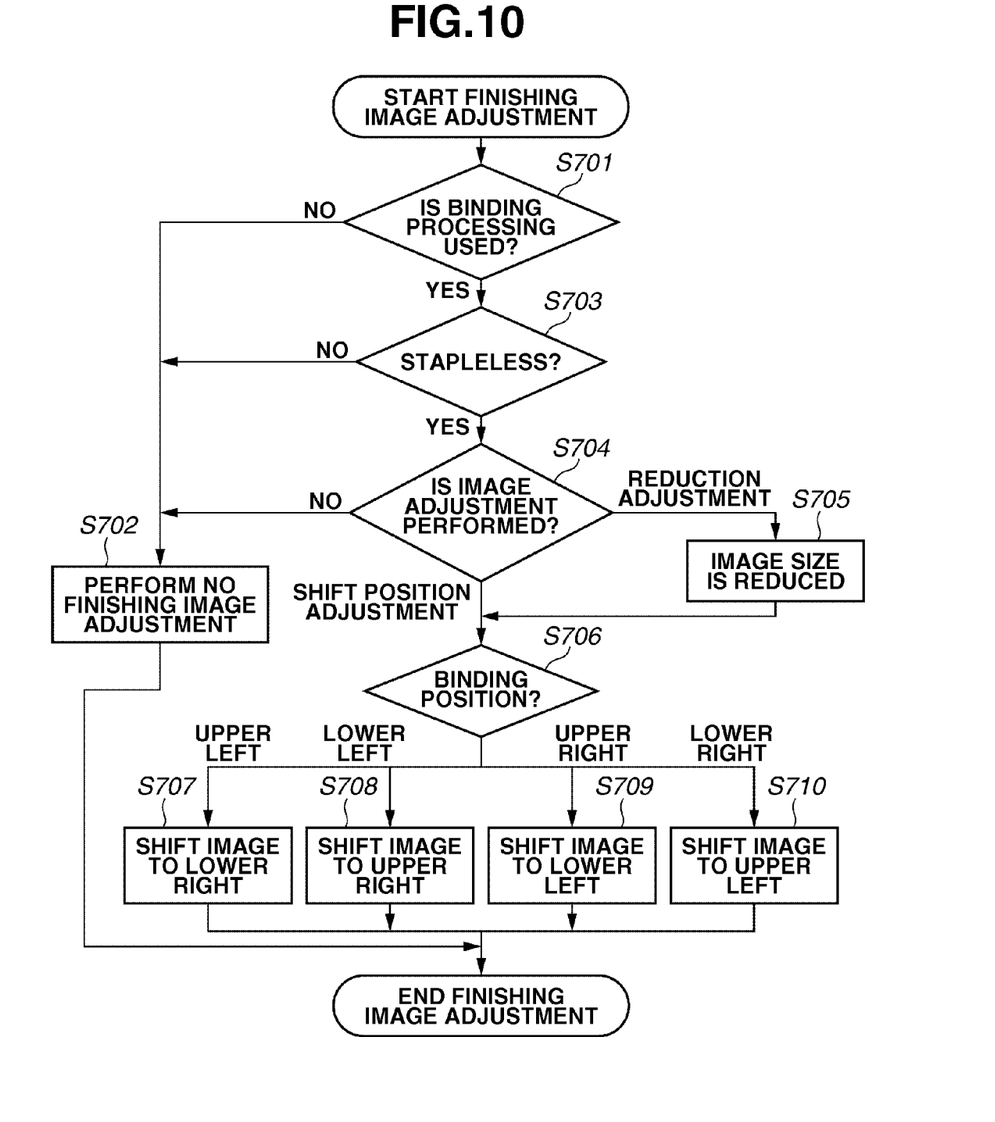
FIG. 10 is a flowchart illustrating a control method of the image processing apparatus.

FIG. 10 is a flowchart illustrating a control method of the image processing apparatus 100 according to the present exemplary embodiment.

The present exemplary embodiment illustrates an example of processing until when a copy job is actually printed. Each step is realized by the CPU 101 illustrated in FIG. 1 executing a program for performing the flowchart described below stored in the ROM 102.

Hereinbelow, an example of controlling the recording unit 107 and sheet processing unit 109 to adjust a printing area of the image data to be printed on a sheet when binding processing by the binding unit is designated, is described in detail. In the present exemplary embodiment, as a method for adjusting a printing area, an example will be described in which the printing position of the image data to be printed is subjected to displacement (shift) processing and reduction processing.

When printing, in step S701, the CPU 101 determines whether the setting of the job is to use the binding function based on the information registered in the SRAM 103. If the CPU 101 determines that the job does not use the binding function (NO in step S701), since the image adjustment as the finishing function is not performed, the CPU 101 advances the processing to step S702 without performing any processing.

On the other hand, if the CPU 101 determines that the job uses the binding function (YES in step S701), the processing proceeds to step S703. In step S703, the CPU 101 determines whether the binding function set by the user to the job is the binding processing using a staple or without using the staple based on the information registered in the SRAM 103. If the CPU 101 determines that the job is a job that uses the binding processing using a staple (NO in step S703), since the image adjustment is not performed as a finishing function, the CPU 101 advances the processing to S702 without performing any processing.

On the other hand, if the CPU 101 determines that the job is a job that uses the binding processing without using a staple (YES in step S703), the processing proceeds to step S704. In step S704, the CPU 101 determines whether the user has issued an instruction to perform image adjustment to the job based on the content of the selection instruction by the user registered in the SRAM 103. If the CPU 101 determines that the job is a job set not to be subjected to adjustment (No in step S703), since the image adjustment as a finishing function is not performed, the CPU 101 advances the processing to step S702 without performing any processing. On the other hand, the CPU 101 determines that the job is a job instructed by the user to be subjected to adjustment and also that the job is instructed to be subjected to the reduction adjustment of the print data to be printed (reduction adjustment in step S704), then, in step S705, the CPU 101 performs reduction processing on the image of the print data to be printed for the number of printing pages to secure margins.

On the other hand, if the CPU 101 determines that the job is a job instructed by the user to be subjected to adjustment and also that the job is instructed to be subjected to the shift adjustment that shifts the image of the print data to be printed (NO in step S704), then, in step S704, the processing proceeds to step S706. In step S706, the CPU 101 determines whether the binding position set by the user is any one of upper left, lower left, upper right, and lower right based on the information registered in the SRAM 103. Then, the CPU 101 performs processing for shifting images of the print data to be printed for the number of pages to be printed to displace thereof to a diagonal position to the setting of the binding position in steps S707, S708, S709, or S710. After completing the image adjustment processing, the image adjustment as finishing processing ends.

In this way, the user can print out an output sheet with the image not having poor visibility, even when the binding function without using a staple is used, by performing easy setting. In other words, the problem that the image printed on the output product has poorer visibility when the binding function without using a staple is used because the visible area of the bound output product is narrower than that when the conventional binding function using a staple is used, can be improved.

When the processing according to the present exemplary embodiment is performed, the visibility of the printed result is improved. However, there may be a case where the output product is reduced a little by the reduction processing or an edge is lost by the shift processing. Therefore, it is preferable that the output product can be restored to the original size when the output product is copied again.

A second exemplary embodiment is described below. In the present exemplary embodiment, when the binding function without using a staple is used in the first exemplary embodiment described above and when the output product subjected to the image adjustment is copied again, the image processing apparatus 100 performs control so that the copied image is restored as the same image as the original document before subjected to the image adjustment.

Figure 11:
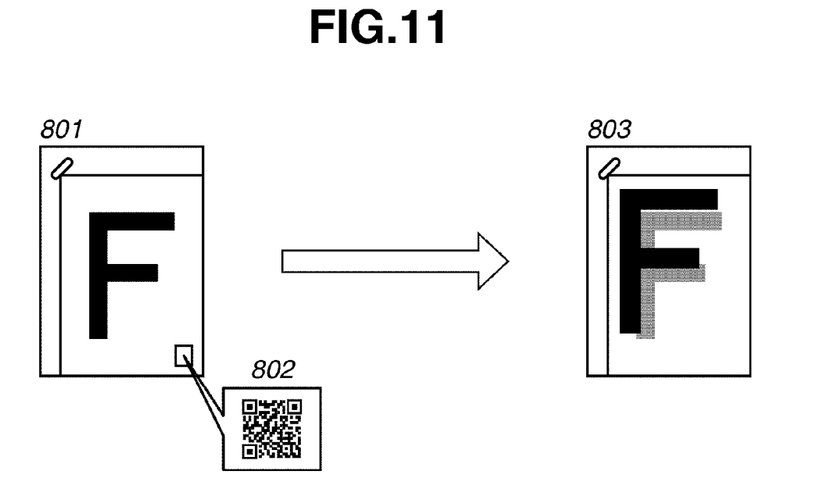
FIG. 11 is a diagram illustrating image processing in the image processing apparatus.

FIG. 11 is a diagram illustrating image processing performed by the image processing apparatus 100 according to the present exemplary embodiment. This example illustrates image processing information printed together with the print data for restoring appropriately the image subjected to the image adjustment to the print data to be printed when the image adjustment is performed in the exemplary embodiment described above. In the present exemplary embodiment, QR code (registered trademark) is exemplified as an example of the additional information.

When the binding function without using a staple described above is used in FIG. 11 and the output product 801 subjected to image adjustment is printed, image processing information 802, which is code data indicating the content of the adjustment, is embedded in the print data.

In a case where the reading unit 106 reads the output product 801 as an original document, when the image processing unit 108 analyzes the read image data and detects code data, the CPU 101 receives an adjustment amount from the image processing unit 108 to automatically performs inverse image adjustment.

Thus, an output 803, which is the same as the original, is obtained by performing the image processing on the read image data to restore the original print data.

Figure 12:
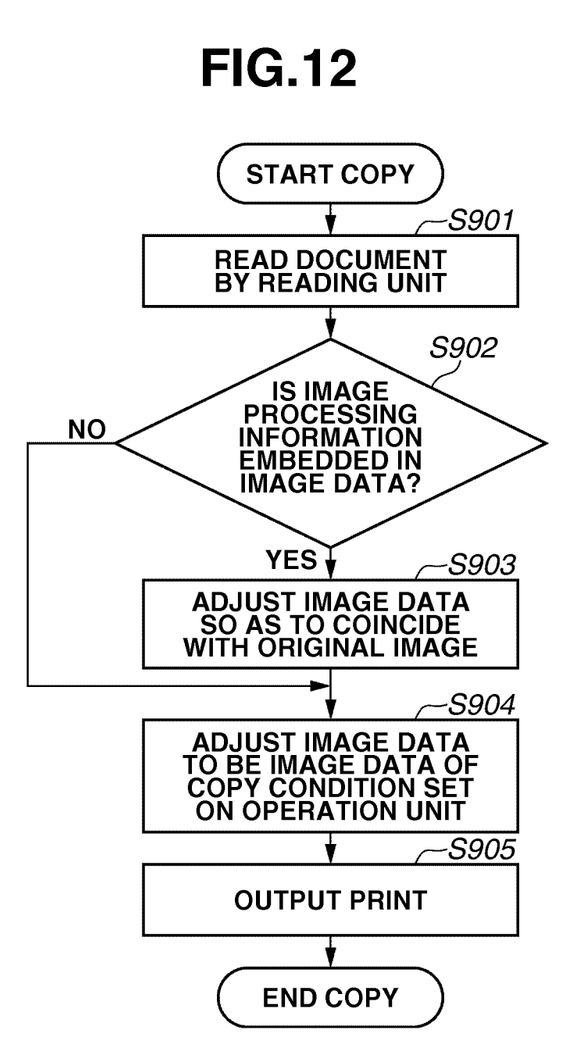
FIG. 12 is a flowchart illustrating a control method of the image processing apparatus.

FIG. 12 is a flowchart illustrating a control method of the image processing apparatus 100 according to the present exemplary embodiment.

The present exemplary embodiment is a processing example of reading a document subjected to image adjustment and printing the read document so as to restore the original document. Each step is realized by the CPU 101 illustrated in FIG. 1 executing a program for performing the flowchart described below stored in the ROM 102.

In step S901, the reading unit 106 reads a document according to the instruction received from the CPU 101 in response to the user operation. In step S902, the CPU 101 causes the image processing unit 108 to analyze the read image data, and determines whether the image processing information 802 is embedded in the read document. If the CPU 101 determines that the image processing information is not embedded (NO in step S902), the CPU 101 advances the processing to step S904 without performing any processing.

On the other hand, if the CPU 101 determines that the image processing information 802 is embedded (YES in step S902), the processing proceeds to step S903. In step S903, the CPU 101 analyzes the image processing information 802 and performs adjustment so that the image data becomes the same as the original image using the image processing unit 108.

In step S904, the CPU 101 adjusts the image data according to the image setting set for the re-copy of this time after adjusting the image data to the state near the original document in advance. More specifically, if it becomes clear that the image is subjected to reduction processing and shift displacement processing, based on the image processing information 802, the CPU 101 controls the image processing unit 108 and the recording unit 107 to readjust the image so as to obtain the state close to the original image by performing enlargement and inverse shift displacement.

Then, in step S905, the recording unit 107 prints out the readjusted image data according to the instruction from the CPU 101, and then the copy processing is completed.

In this way, when copy processing is performed with a printed product subjected to the binding processing without using a staple being an original document, a print result close to the original document can be obtained by reading the image processing information 802 attached to the document.

In addition, by having the function for restoring the size and the position of the original when the printed product is re-copied, the printed image of the automatically adjusted output product can be restored easily.

In the present exemplary embodiment, though the print job is generated from the image data read by the reading unit 106, the present exemplary embodiment can be applied to an image processing apparatus that communicates with the data processing apparatus using the communication interface 111 via the network 112 illustrated in FIG. 1.

In that case, the image processing apparatus receives a print job, to which binding processing without using a staple is set, by communicating with the data processing apparatus via the network 112. At that time, the UI screen for selecting binding processing without using a staple may be provided to a user of the data processing apparatus as needed, and the instruction of the user of the data processing apparatus side may be reflected to the processing of the print job.

According to the present exemplary embodiment, when the binding processing without using a staple is performed, the image data to be printed can be printed on a sheet with a good readability.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-035976 filed Feb. 22, 2012, which is hereby incorporated by reference herein in its entirety.

What is claimed is:

1. A print control apparatus for controlling a first binding unit configured to perform a first binding processing for binding a plurality of sheets without using a staple and a second binding unit configured to perform a second binding processing for binding a plurality of sheets using a staple, the apparatus comprising:
a printing unit configured to print an image on a sheet;
a displaying unit configured to display, when the first binding processing is selected, a screen on which a user can designate whether or not to adjust a printing area of the image to be printed on the sheet; and
a control unit configured to adjust the printing area of the image to be printed on the sheet when it is designated via the displayed screen to adjust the printing area of the image.

2. The print control apparatus according to claim 1, wherein the control unit is configured to adjust the printing area by reducing size of the image to be printed on the sheet.

3. The print control apparatus according to claim 1, wherein the control unit is configured to adjust the printing area by displacing a print position of the image to be printed on the sheet.

4. The print control apparatus according to claim 1, wherein the control unit is configured to adjust the printing area by reducing size of the image to be printed on the sheet and displacing a print position of the image.

5. The print control apparatus according to claim 1, wherein the control unit is configured to control the printing unit to print the image and image processing information indicating that the printing area of the image is adjusted on the sheet.

6. The print control apparatus according to claim 5, further comprising:
a reading unit configured to read the image processing information and the image printed on the sheet, wherein the control unit is configured to adjust, based on the image processing information and the image read by the reading unit, the printing area in which the read image is to be printed.

7. The print control apparatus according to claim 5, wherein the control unit is configured to perform control of whether to print the image processing information according to a user's selection instruction.

8. The print control apparatus according to claim 6, wherein the control unit is configured to perform control of whether to adjust the printing area of the read image according to a user's selection instruction when the reading unit reads the image processing information.

9. A print control method for controlling printing an image on a sheet, the method comprising:
    performing a printing processing for printing an image on a sheet;
    performing a first binding processing for binding a plurality of sheets without using a staple;
    performing a second binding processing for binding a plurality of sheets using a staple;
    displaying, when the first binding processing is selected, a screen on which a user can designate whether or not to adjust a printing area of the image to be printed on the sheet; and
    adjusting the printing area of the image to be printed on the sheet when it is designated via the displayed screen to adjust the printing area of the image.

10. The print control method according to claim 9, wherein the adjusting the printing area includes reducing size of the image to be printed on the sheet.

11. The print control method according to claim 9, wherein the adjusting the printing area includes displacing a print position of the image to be printed on the sheet.

12. The print control method according to claim 9, wherein the adjusting the printing area includes reducing size of the image to be printed on the sheet and displacing a print position of the image.

13. The print control method according to claim 9, further comprising:
    printing the image and image processing information indicating that the printing area of the image is adjusted on the sheet.

14. The print control method according to claim 13, further comprising:
    reading the image processing information and image data printed on the sheet; and
    adjusting, based on the read image processing information and the read image data, the printing area in which the read image is to be printed.

15. The print control method according to claim 14, further comprising:
    determining whether to adjust the printing area of the read image according to a user's selection instruction when the reading unit reads the image processing information.

16. The print control method according to claim 13, further comprising:
    determining whether to print the image processing information according to a user's selection instruction.

17. A non-transitory computer-readable storage medium for storing a program causing a computer to execute a print control method, the program comprising:
    performing a printing processing for printing an image on a sheet;
    performing a first binding processing for binding a plurality of sheets without using a staple;
    performing a second binding processing for binding a plurality of sheets using a staple;
    displaying, when the first binding processing is selected, a screen on which a user can designate whether or not to adjust a printing area of the image to be printed on the sheet; and
    adjusting the printing area of the image to be printed on the sheet when it is designated via the displayed screen to adjust the printing area of the image.

\* \* \* \* \*